United States Patent
Sibert

(10) Patent No.: US 9,158,936 B2
(45) Date of Patent: Oct. 13, 2015

(54) METHOD OF AND APPARATUS FOR STORING DATA

(75) Inventor: Herve Sibert, Le Mans (FR)

(73) Assignees: ST-Ericsson SA, Plan-les-Ouates (CH); ST-Ericsson (France) SAS, Grenoble (FR)

(*) Notice: Subject to any disclaimer, the term of this patent is extended or adjusted under 35 U.S.C. 154(b) by 0 days.

(21) Appl. No.: 13/516,466

(22) PCT Filed: Dec. 17, 2010

(86) PCT No.: PCT/EP2010/070165
§ 371 (c)(1),
(2), (4) Date: Aug. 24, 2012

(87) PCT Pub. No.: WO2011/073435
PCT Pub. Date: Jun. 23, 2011

(65) Prior Publication Data
US 2012/0317344 A1 Dec. 13, 2012

(30) Foreign Application Priority Data

Dec. 18, 2009 (EP) .................................. 09306277

(51) Int. Cl.
G06F 13/00 (2006.01)
G06F 21/64 (2013.01)
G06F 21/57 (2013.01)
G06F 21/79 (2013.01)

(52) U.S. Cl.
CPC .............. G06F 21/64 (2013.01); G06F 21/572 (2013.01); G06F 21/79 (2013.01); G06F 2221/2101 (2013.01); G06F 2221/2107 (2013.01)

(58) Field of Classification Search
CPC combination set(s) only.
See application file for complete search history.

(56) References Cited

U.S. PATENT DOCUMENTS

| 5,229,972 | A | 7/1993 | Kondo et al. | |
| 5,390,317 | A | 2/1995 | Weiss et al. | |
| 7,142,452 | B1* | 11/2006 | Tiwari | 365/185.04 |
| 2006/0092049 | A1* | 5/2006 | Dellow | 341/50 |
| 2007/0157000 | A1* | 7/2007 | Qawami et al. | 711/170 |
| 2008/0052450 | A1* | 2/2008 | Buer | 711/103 |
| 2008/0109904 | A1 | 5/2008 | In et al. | |

FOREIGN PATENT DOCUMENTS

EP  1640844 A1  3/2006

* cited by examiner

Primary Examiner — Charles Rones
Assistant Examiner — Han Doan
(74) Attorney, Agent, or Firm — Howison & Arnott, L.L.P.

(57) ABSTRACT

An electronic device for storing data content by storing at least a portion of the data content in a rewritable memory device by storing an n bit count value associated with the status of the data content in a one time programmable memory. The n bit count value is written to the secure memory device along with the corresponding data content. Then the n bit count value is incremented and stored in the one time programmable memory each time there is a modification of the data content in the rewritable memory device. The number of bits of the one time programmable memory may correspond to the number of potential modifications of the stored data content.

13 Claims, 6 Drawing Sheets

METHOD OF AND APPARATUS FOR STORING DATA

CROSS-REFERENCE TO RELATED APPLICATIONS

This application is a U.S. National Phase application submitted under 35 U.S.C. §371 of Patent Cooperation Treaty application serial no. PCT/EP2010/070165, filed Dec. 17, 2010, and entitled METHOD OF AND APPARATUS FOR STORING DATA, which application claims priority to European patent application serial no. 09306277.6, filed Dec. 18, 2009, and entitled METHOD OF AND APPARATUS FOR STORING DATA.

Patent Cooperation Treaty application serial no. PCT/EP2010/070165, published as WO 2011/073435, and European patent application serial no. 09306277.6, are incorporated herein by reference.

TECHNICAL FIELD

The present invention relates in general to a method and apparatus for storing data. Particularly but not exclusively, the invention relates to a method of storing sensitive data using a one time programmable memory and a rewritable memory for storing the data content.

BACKGROUND

A typical requirement in the secure storage of sensitive data is to provide a memory having memory fields that can be written once with the assurance that once a memory field is written it can no longer be modified.

Some forms of secure data storage are based on cryptographic mechanisms using a unique key to provide confidentiality and integrity of the stored data. However, in such storage it is sometimes possible to replace the stored data content with previous content of the secure memory. For example, if the supposed state at date T of the data is stored in the secure storage, and it is changed (by setting a bit to 1) at date T', it is possible to revert to a prior data state by replacing the data of the secure storage with a copy of the data of the secure storage at date T. For example in the case of a software update a more recent version of software may be replaced by an older version of the software, an undesirable process which is often referred to as rollback.

A one time programmable (OTP) memory is often used to store sensitive data, which should be integrity and/or confidentiality-protected. An OTP memory is a form of digital memory where the setting of each bit can be locked by a fuse or anti-fuse. The memory can be programmed just once after manufacturing by an irreversible process for opening a connection in the case of a fuse or closing a connection in the case of an anti-fuse. Due to the irreversible processes involved once data is set to a certain state in such a memory it can no longer be modified. Some processors (baseband, application processors) embed a number of OTP memories containing at least one secret key, unique to each chip. This key can then be used to provide a secure storage functionality often required by manufacturers to bind data to the platform.

An OTP memory is however very costly. In particular in the case of the storage of keys or hashes, which include at least 128 bits, the related cost for storage of the data can be very high.

Moreover, a problem sometimes encountered when programming an OTP is when a loss of power occurs during the programming procedure. When rereading the OTP memory after the power has been restored, an error will be indicated because of the loss of power having taken place during writing of the memory. It will not be clear however if the indicated error relates to a loss of power or to another cause such as an unauthorized attempt to rewrite the OTP memory.

SUMMARY

The present invention has been devised with the foregoing in mind.

Accordingly, a first aspect of the invention provides a method of storing data content, the method comprising: storing at least a portion of the data content in a reprogrammable or rewritable memory device; storing an n bit count value associated with the status of the data content in a one time programmable memory, the n bit count value being written to the rewritable memory device with the corresponding data content, wherein the n bit count value is incremented and stored in the one time programmable memory for each modification of the data content in the reprogrammable memory device. The number of bits of the one time programmable memory in some embodiments of the invention may correspond to the number of potential modifications of the stored data content.

A second aspect of the invention provides an electronic device comprising a rewritable memory unit for storing at least a portion of data content and a n bit count value associated with the data content; a one time programmable memory for storing a n bit count value associated with the status of the data content, and a processor for operating the rewritable memory unit, wherein the one time programmable memory is operable to increment the n bit count value for each modification of the data content in the rewritable memory unit. The number of bits of the one time programmable memory may correspond to the number of potential modifications of the stored data content.

In embodiments of the invention:

The data content stored in the rewritable memory device may be composed of n data fields, and wherein each time a data field is modified a bit of the n-bit count value stored in the OTP is set from 0 to 1.

The data content may be stored in the rewritable memory device using a cryptographic key unique to the rewritable memory device, and wherein the cryptographic key is stored in a data field of the OTP.

The count value stored in the OTP may be concatenated to the data content before the data content is written to the rewritable memory device.

Each data field of the data content may have a corresponding lock bit field, the lock bit field being set to indicate that the corresponding data field can no longer be modified once the data field has been modified and wherein during a writing operation in which data content is to be modified, the lock bit field is checked to determine whether the data can be written to the said data field.

During a writing operation to modify the data content in the rewritable memory it may be checked to verify that each data bit set to 1 in the old data content is set to 1 in the new data content in order to determine if the writing operation is authorized.

During a reading operation to read data stored in the rewritable memory the count value stored in the one time programmable memory may be compared with the count value associated with the data content read from the rewritable memory to determine if the count value read from the rewritable memory is greater than the count value stored in the one time programmable memory.

The data content may be stored in a main location of the rewritable memory device and at back up location of the rewritable memory device so that the data content stored in said back up location may be copied to the main location in the case of error.

At least part of the methods according to the invention embodiments may be computer implemented and may be implemented in software on a programmable apparatus. They may also be implemented solely in hardware or in software, or in a combination thereof.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which.

DETAILED DESCRIPTION

Figure 1A:
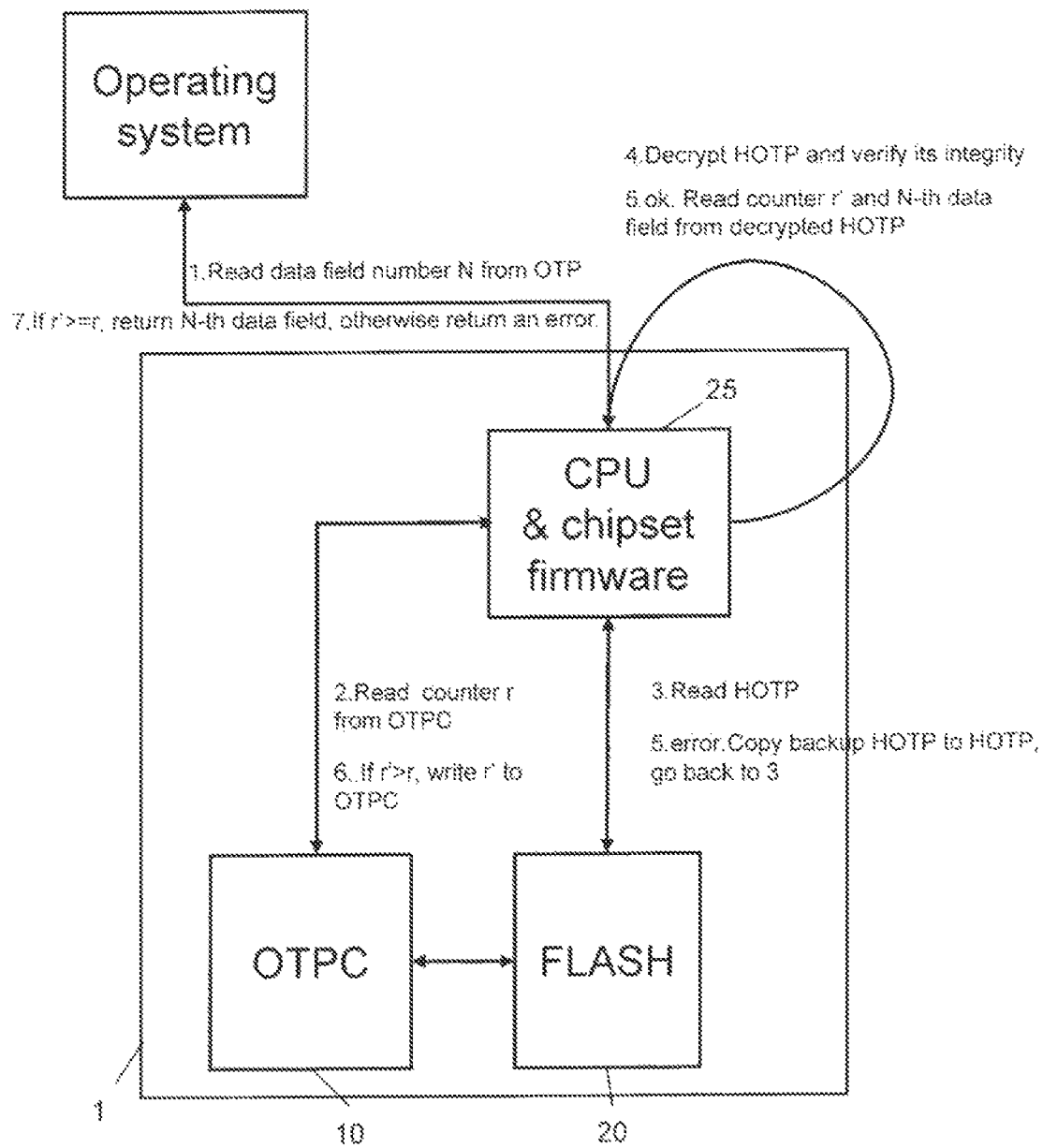
FIG. 1A is a schematic diagram of a memory arrangement in an electronic device according to a first embodiment of the invention illustrating the data flow of a reading procedure.

A first embodiment of a memory configuration 1 according to the invention will be described with reference to FIG. 1A. An electronic device such as a wireless communication device includes a memory arrangement of the first embodiment comprising a hardware one time programmable (OTP) memory 10 and a rewritable non volatile memory device 20 such as a flash EPROM memory. The rewritable memory 20 is controlled by means of CPU and chipset firmware 25 in communication with an operating system 30. The data content C to be stored securely against attack is made up of n data fields. The OTP memory 10 stores n bits and acts as a counter OTPC which can be incremented by setting one of the n bits from 0 to 1. In this embodiment the number of bits n which can be stored by the OTP memory 10 corresponds to the maximum number of modifications of the data content which may occur. Moreover, in this embodiment the maximum number of modifications of the data content corresponds to the number n of fields of the data content since a field is written at a time. The rewritable memory device 20 is implemented as secure storage for storing the n fields of data content enabling the data content C to be stored in the rewritable non volatile memory 20 rather than in an OTP memory. In some embodiments of the invention a portion of the data fields of the data may be stored in the rewritable memory device while the remaining data fields are stored in an OTP type memory.

While in this embodiment the number of bits of the OTPC corresponds to the number of data fields of the data content, it will be appreciated that in alternative embodiments of the invention the number "n" of bits for the OTPC and the number of fields may not necessarily be equal. In some embodiments for example the rewritable memory may include data fields in which reverting bits to 0 could be possible, for instance to write in a data field a number in binary format that could be updated, such that the OTPC size could be bigger than the number of data fields. On the contrary, we may have in the definition of the data content for the rewritable memory several data fields that are supposed to be updated simultaneously, in which case the number of bits for the OTPC could be less than the number of data fields.

Data may be stored and retrieved from the rewritable memory 20 using a secure storage operation to store and retrieve data securely, protecting both the confidentiality and integrity of the data, by using a cryptographic key unique to the chipset. In some embodiments of the invention the cryptographic key may be stored in an OTP field of the OTP memory 10 or in another OTP memory associated with the memory arrangement. An encrypt decrypt function can be used to store the data content in the memory device 20. For example, an encrypt and decrypt function can be implemented by the Advanced Encryption Standard FIPS 197 in the cipher block chaining mode with a 128-bit key embedded in the device may be used to read and write data to the memory device 20. The encrypt and decrypt functions may be combined with an integrity protecting function that computes a footprint of the data content in order to write it during a write operation or to verify it during a read operation. This integrity-protecting function may be a public signature, a message authentication code (MAC), or the like. The data content to be encrypted/integrity protected by such function includes the data content itself as well as the count value r of the OTP memory.

The status of the OTP memory counter (OTPC) 10, which corresponds to count value r, the number of bits in the OTPC 10 set to 1, is associated with the data content C in the rewritable memory 20. This can be achieved by concatenating the count value r of the OTP memory 10 to the data content C before writing the data content to the rewritable memory 20.

Figure 2A:
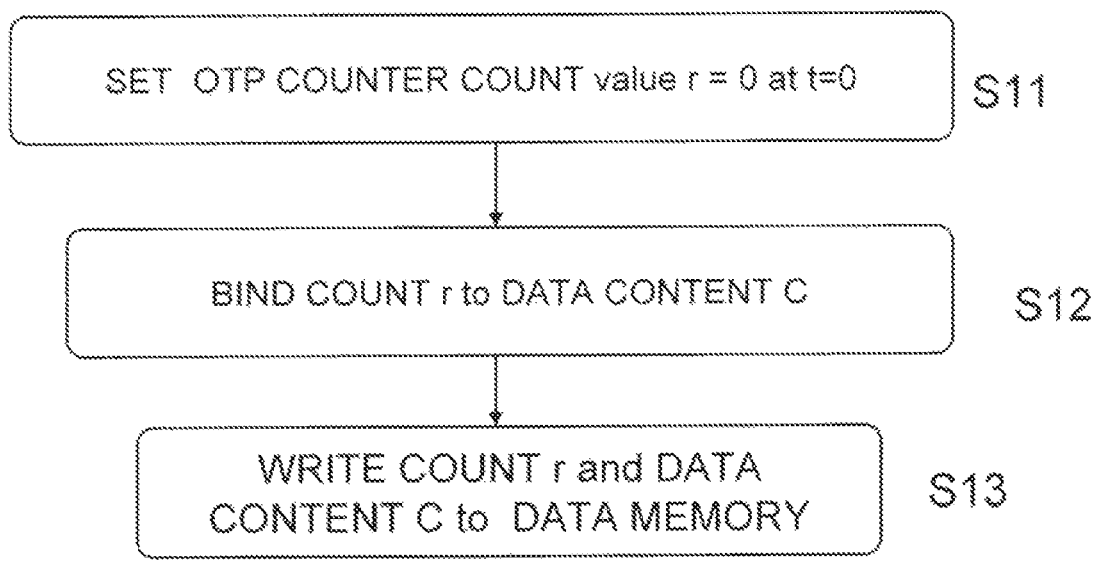
FIG. 2A is a flow chart illustrating steps of an initialization procedure according to a first embodiment of the invention.
Figure 2B:
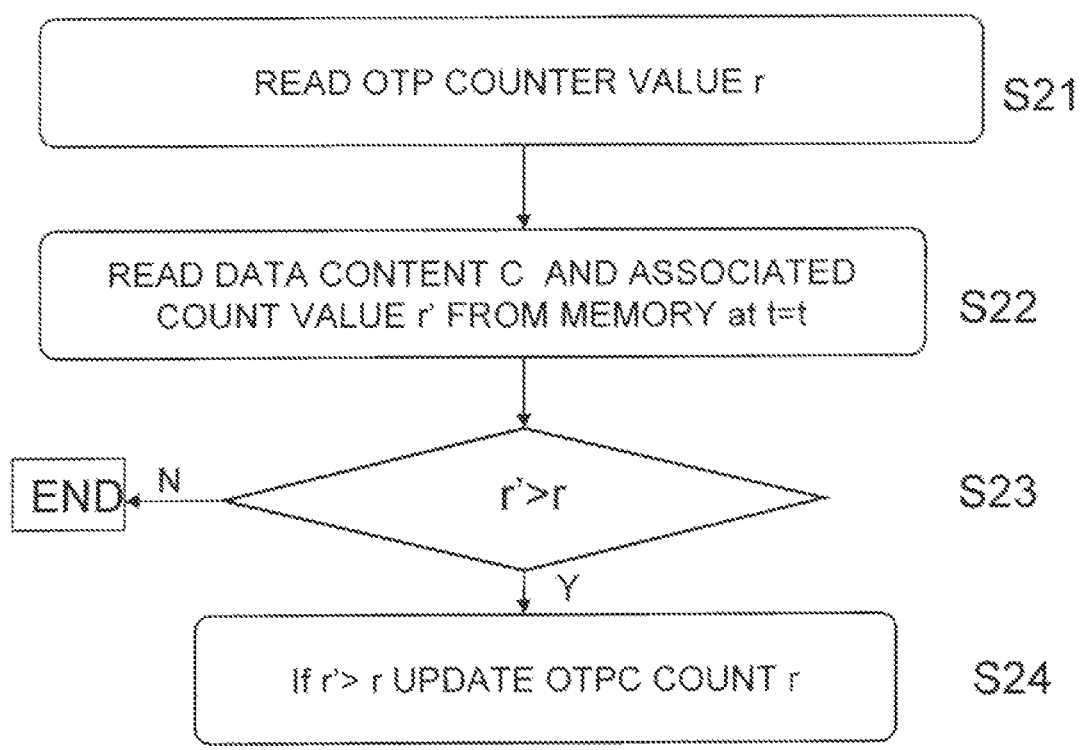
FIG. 2B is a flow chart illustrating steps of a reading procedure according to a first embodiment of the invention.

Operation of the memory arrangement will now be described with reference to FIGS. 2A to 2C. In step S11 of FIG. 2A an initialization process is implemented by setting the value r stored in the OTP memory 10 to 0 at time t=0. The data content C at time t=0 is defined as OTP(0) and is written to the memory 20 using the secure storage procedure in step S13. The value HOTP(0) saved to rewritable memory device 20 at time 0 is then HOTP(0)=SecWrite (0 . . . 0∥OTP(0)), where 0 . . . 0 is a fixed-length field read as a binary value whose value is the number of bits set to 1 in the OTPC 10, i.e. 0 at time t=0. ∥ denotes concatenation To read at time t, where t>0, the data content stored in memory 20 a reading procedure as illustrated in FIG. 2B is implemented as follows:

Read the OTPC value r (number of bits set to 1) in the OTP memory 10 in step S21.

In step S22 Compute SecRead(HOTP(t)) to read the data content C at time t of the rewritable memory device 20 and read the data as r' ∥ C, where r' corresponds to the count number associated with the data content C at time t.

In step S23 Check that r'>r, for example check if r'=r+1, r'=r+2 etc. If r'=r then the data content C in rewritable memory device 20 has not been modified, if r'=r+1, then the data content C has been modified'. If r'=r+2 then two data fields have been updated at once. Otherwise the data stored in the memory device 20 has been corrupted using a replay attack and operation of the device should be blocked. The data C is retrieved—OTP(t)=C.

In step S24 if r'>r, then update OTPC to by setting r'−r bits to 1. This may be the case where the data content C has been modified but the OTP counter memory 10 has not yet been updated with new value r'.

Figure 2C:
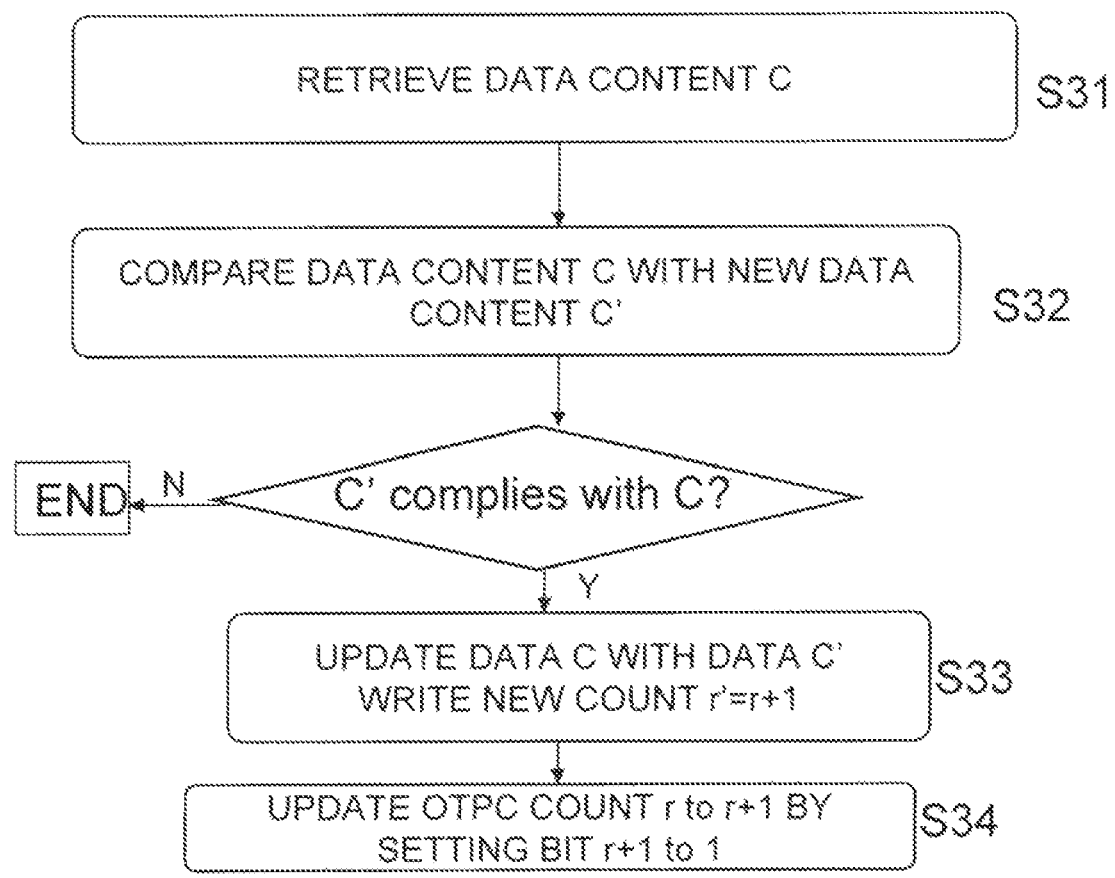
FIG. 2C is a flow chart illustrating steps of a writing procedure according to a first embodiment of the invention.

To write at time t, where t>0, data C' to the memory device 20, a writing procedure as illustrated in FIG. 2C is implemented as follows:

In step S31 retrieve the current data C stored in the memory device 20 OTP(t)=C by performing a reading operation as described above with reference to FIG. 2B.

In step S32 check that the new value C' of data to be stored in the memory device 20 complies with the current value C retrieved from the memory 20, i.e. each bit 1 in former data C is also 1 in new data C', otherwise withdraw the operation since only changing the state of a data bit from 0 to 1 is authorized in the writing procedure.

In step S33 update the data stored in memory C to data C' by the command HOTP(t+1)=SecWrite(r+1||C'), by writing the new count r+1 concatenated with the new data C'.

In step S34 update the count stored in OTP memory 10 OTPC by setting bit r+1 to 1.

Update of the count r stored in OTP memory 10 is implemented after the new data C' has correctly been stored in external memory device 20.

In case of external failure, for example a power failure during the writing procedure, if the data content in the rewritable memory device 20 has not yet been updated, the writing operation can be restarted to write the new data C' to the memory device 20. In this case before writing the new data C' the data contents of the rewritable memory device 20 can be reverted to the old data C. If the data contents of the rewritable memory device 20 have been updated with the new data C' but the count r of the OTP memory counter 10 OTPC was not updated prior to the power loss then the count r of the OTPC 10 will be updated during the next reading phase by setting r to r'=r+1. This enables an error correction functionality to be provided.

For each writing operation to the memory device 20, exactly one bit of the n bits of the OTP memory counter OTPC 10 is set, regardless of the number of data bits modified in the rewritable memory device 20. In a real hardware OTP, each data field is meant to be modified once at most. In order to ensure that each field is modified at most once in the external rewritable memory device 20, in some embodiments of the invention a "lock bit field" can be added to every data field. This lock bit is then set to 1 when a writing operation modifies the corresponding data field of the memory device 20 to indicate that the field has already been written. This enables modification of the data content only to be authorized for data fields which have not yet been written. In a hardware one time programmable memory, quite often a field (or a set of fields) already has (have) a twin field called a "lock bit" indicating whether or not the field (or the set of fields) is (are) still modifiable. With this enhancement of the additional lock fields, the existing original HW OTP lock fields can then be ignored or mapped to the additional lock fields.

Figure 3:
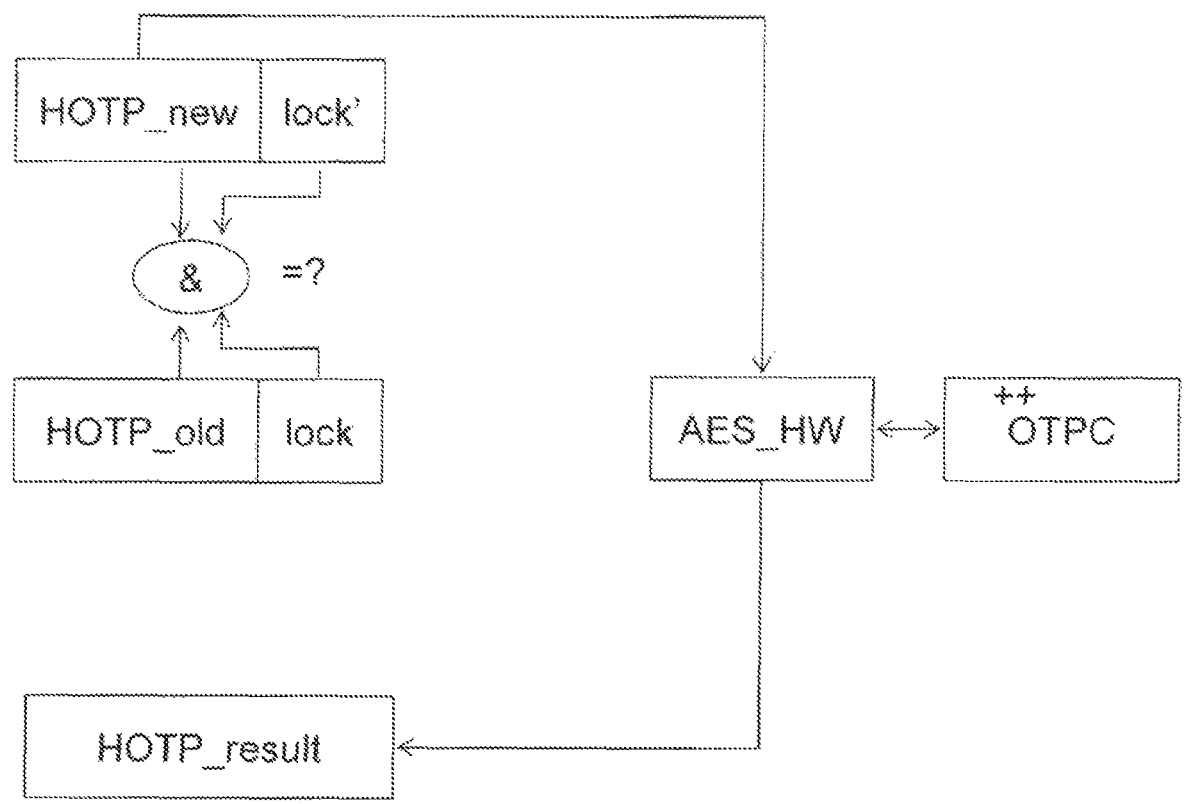
FIG. 3 is a schematic block diagram of a part of the writing procedure according to an embodiment of the invention.

With reference to FIG. 3, a writing operation can include checking the local status in the lock field lock to determine if there has been an attempt to unlock the data being resetting the status of the lock field. This involves a logical AND operation between the bits of the lock field of the data field HOTP_old as stored with the lock field lock' of the new data field HOTP_new to be written. Alternatively the data HOTP_old can be checked to ensure that the HOTP_old in a locked data field has not been modified. The bits set to 1 in HOTP_old are checked with the bits of HOTP_new by a logical AND operation to ensure that bits set to 1 in HOTP_old are also set to 1 in HOTP_new. The new data content HOTP_new replaces the old data content HOTP_old as HOTP_result. The counter OTPC is incremented to set a further bit to 1.

If all the bits of the OTPC are set to 1, this signifies that each of the n fields of the rewritable memory 20 have been updated once. No further update of the data in rewritable memory 20 can be performed.

Embodiments of the invention enable the size of an OTP required for storing sensitive data to be reduced by storing at least a portion of the data which would have been stored in a HW OTP memory in an external storage (for example a flash memory), managed by software, and having the similar security properties (confidentiality, integrity, modifications with anti-replay) as a HW OTP. The size of the OTP required depends on the number of updates likely to be performed, each bit of the OTP corresponding to a potential update.

FIG. 1A illustrates the dataflow between the elements of the memory configuration according to the first embodiment of the invention for a reading procedure. In 1) the operating system transmits the command to read data field number N from an OTP. In 2) the counter value r is read from the OTPC. In 3) the data HOTP is read from Flash memory 20. In 4) the data content is decrypted and its integrity is verified by the CPU. In 5) if the integrity of the data content is OK the counter value r' associated with the data HOTP is read and the N-th data field from the decrypted data content HOTP is read. If it is determined that r'>r, r' is written to the OTPC 10 in step 6). Otherwise in 5) if there is an error back up HOTP data is written to the flash memory 20 and step 3) of the read procedure of the flash memory 20 is performed.

Figure 1B:
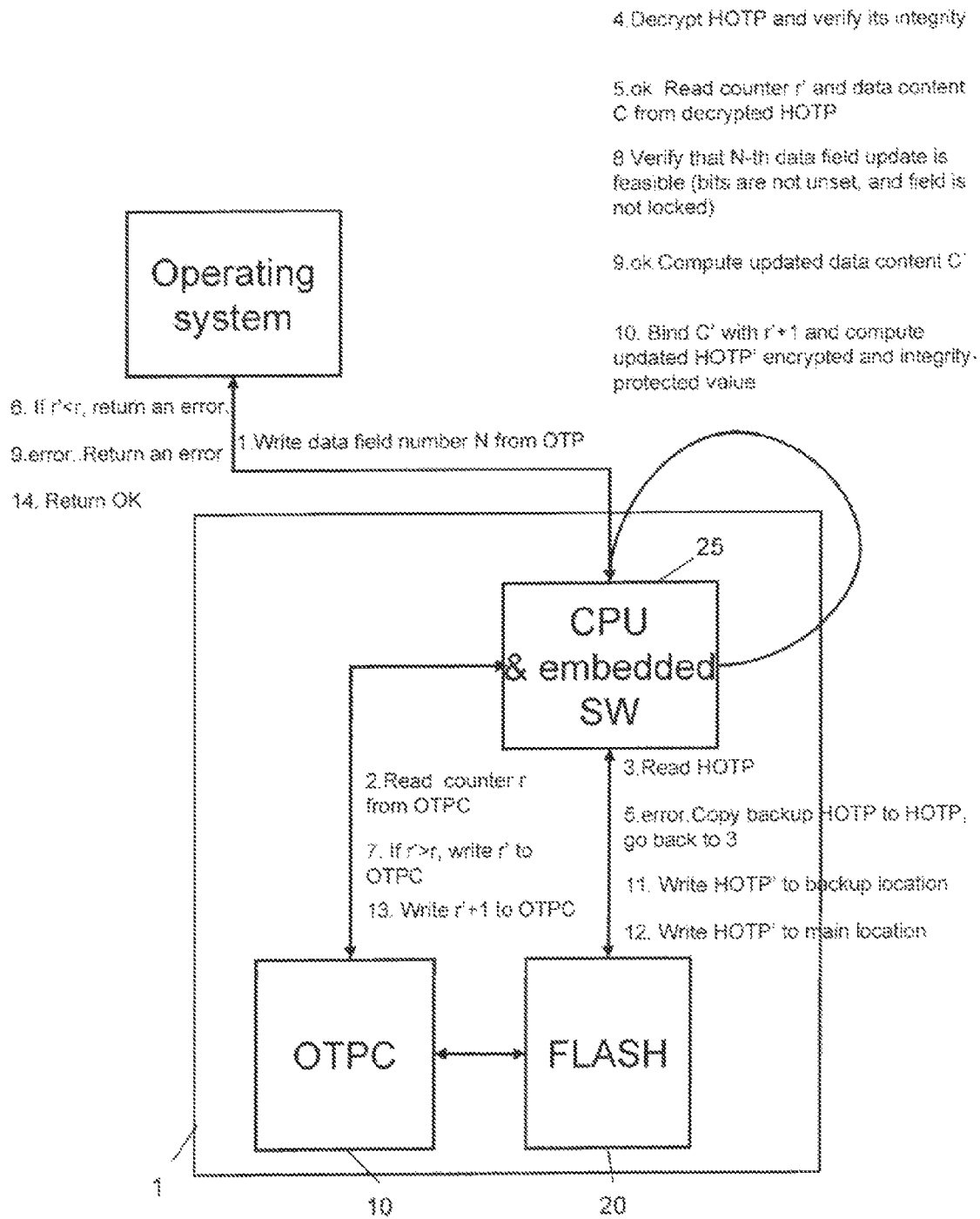
FIG. 1B is a schematic diagram of a memory arrangement in an electronic device according to a second embodiment of the invention illustrating the data flow of a writing procedure.

FIG. 1B illustrates the dataflow between the elements of the memory configuration according to an alternative embodiment of the invention for a writing procedure. In this embodiment the processor 25 comprises a CPU and embedded SW. The remaining elements are similar to the elements of the first embodiment. In 1) the operating system issues a command to write data field number N from an OTP. In 2) the counter value r is read from the OTPC 10. In 3) the data HOTP is read from the flash memory 20. In 4) the data HOTP is decrypted and its integrity is verified. In 5) if the integrity of the data content is OK the counter value r' associated with the data HOTP is read and the data content C from the decrypted data HOTP is read. Otherwise in 5) if there is an error back up HOTP data is written to the flash memory 20 and a read procedure of the flash memory 20 is performed. If it is determined that r'<r, an error is returned in step 6) to the operating system. Otherwise if it is determined that r'>r, r' is written to the OTPC 10 in step 7). In step 8) it is verified that the N-th data field update is feasible by checking that bits of the data have not been unset from 1 to 0 or the data field is not locked. In step 9) if the verification is favorable, updated data content C' is computed. In step 10) the updated data content C' is bound with the count value r'+1. The encrypted updated HOTP' is calculated and the integrity protected value is computed. In step 11) the HOTP' is written to a back up location and the in step 12) the HOTP' is written to a back up location of the flash memory 20 so that it may be copied to the main location in case of error.

Embodiments of the invention provide access to a memory that is security protected, with data bits that can be set but cannot be unset, thus providing equivalent functionalities of a hardware OTP.

The method according to the embodiments of the invention can find applications in the storage of sensitive data which should be integrity and confidentiality protected. For example embodiments of the invention may be applied in the storage of software or firmware updatable over the air, online or otherwise, in the prevention of roll back in electronic devices such as mobile platforms, set-top boxes and car devices. Other embodiments of the invention may be in applied in the storage of sensitive personal, commercial, security data or the like on secure devices.

Although the present invention has been described hereinabove with reference to specific embodiments, the present invention is not limited to the specific embodiments, and modifications will be apparent to a skilled person in the art which lie within the scope of the present invention.

For instance, while in the foregoing examples all of the data content is stored in the rewritable memory, it will be appreciated that in further embodiments a portion of the data content may be stored in the rewritable memory while a portion of the data content is stored in a OTP memory unit.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A method of storing data content, the method comprising:
   storing at least a portion of the data content in a rewritable memory device, wherein the data content comprises a plurality of data fields, and wherein each data field has a corresponding lock bit field;
   reading a n bit count value, which corresponds with the data content from a one time programmable memory counter (OTPMC), wherein the OTPMC comprises an n bit count value in a one time programmable memory (OTPM), the n bit count value initially comprising n bits in a first unwritten state and is configured to be incremented by writing one of the unwritten n bit count value bits such that the unwritten n bit count value bit is changed from the first unwritten state to a second state;
   setting the lock bit field to a predetermined binary state to indicate that the corresponding data field can no longer be modified once the data field has been modified;
   checking the lock bit field binary state during a writing operation in which data content is to be modified to determine whether the data can be written to the data field;
   writing the n bit count value to the rewritable memory device with the corresponding data content;
   incrementing the n bit count value of the OTPMC;
   storing the incremented n bit count value in the OTPM; and
   storing the incremented n bit count value in the rewritable memory device with the corresponding data content each time a modification of the data content occurs in the rewritable memory device.

2. The method according to claim 1, wherein the data content stored in the rewritable memory device is composed of n data fields, and wherein each time a data field is modified the n-bit count value in the OTPMC is incremented by writing a next one of the unwritten n bit count value bits such that the unwritten n bit count value bit is changed from the first unwritten state to the second state.

3. The method according to claim 1, wherein the data content is stored in the rewritable memory device using a cryptographic key unique to the rewritable memory device, and wherein the cryptographic key is stored in a data field of the OTPM.

4. The method according to claim 1, wherein the n bit count value read from the OTPMC is concatenated to the data content before the data content is written to the rewritable memory device.

5. The method according to claim 4, further comprising checking, during a writing operation to modify the data content in the rewritable memory, to verify that each n bit count value written to the rewritable memory device in a previous data content is included in the new data content in order to determine if the writing operation is authorized.

6. The method according to claim 1, further comprising comparing, during a reading operation to read data stored in the rewritable memory, the incremented n bit count value stored in the OTPMC with the n bit count value associated with the data content read from the rewritable memory to determine if the n bit count value read from the rewritable memory is greater than the incremented n bit count value stored in the OTPMC.

7. An electronic device comprising:
   a rewritable memory unit for storing at least a portion of data content and a first n bit count value associated with the data content, wherein the data content comprises a plurality of data fields, and wherein each data field has a corresponding lock bit field;
   a one time programmable memory (OTPM) comprising a one time programmable memory counter (OTPMC), the OTPMC comprising a plurality of bits in a first unwritten state, the OTPMC is configured to the first n bit count value by changing one of the plurality of n bits from the first unwritten state to a second state; the OTPM being further configured to store a second n bit count value associated with the first n bit count value, and
   a processor for operating the rewritable memory unit;
   wherein the OTPMC is operable to increment the first n bit count value for each additional modification of the data content in the rewritable memory unit;
   wherein processor is configured to set the lock bit field to a predetermined binary state to indicate that the corresponding data field can no longer be modified once the data field has been modified; and
   wherein the processor is configured to check the lock bit field binary state during a writing operation in which data content is to be modified in order to determine whether the data can be written to the data field.

8. The electronic device according to claim 7, wherein the data content stored in the rewritable memory unit is comprised in n data fields, and wherein each time one of the n data fields is modified a bit of the first n bit count value in the OTPMC is set from the first unwritten state to the second state.

9. The electronic device according to claim 8, wherein each data field of the data content has a corresponding lock bit field, the lock bit field comprising a bit set to indicate that the corresponding data field can no longer be modified and wherein the processor is operable during a writing operation in which data content is to be modified, to check the lock bit field to determine whether data can be written to the data field.

10. The electronic device according to claim 7, wherein the processor is operable to store the data content in the rewritable memory unit using a cryptographic key unique to the rewritable memory unit, and wherein the cryptographic key is stored in a data field of the OTPMC.

11. The electronic device according to claim 7, wherein before the data content is written to the rewriteable memory device, the processor is operable to concatenate the second n bit count value stored in the OTPM to the data content as the first n bit count value.

12. The electronic device according to claim 11, wherein the processor is operable, during a writing operation to modify the data content in the rewritable memory, to verify that the first n bit count value is included in a new data content in order to determine if the writing operation is authorized.

13. The electronic device according to claim 7, wherein the processor is operable, during a reading operation to read data stored in the rewritable memory, to compare the second n bit count value in the OTPM with the first n bit count value associated with the data content read from the rewritable memory to determine whether the first n bit count value read from the rewritable memory is greater than the second n bit count value stored in the one time programmable memory.

* * * * *